(12) United States Patent
De Groot et al.

(10) Patent No.: US 7,978,337 B2
(45) Date of Patent: Jul. 12, 2011

(54) INTERFEROMETER UTILIZING POLARIZATION SCANNING

(75) Inventors: Peter De Groot, Middletown, CT (US); Xavier Colonna De Lega, Middlefield, CT (US)

(73) Assignee: Zygo Corporation, Middlefield, CT (US)

( * ) Notice: Subject to any disclaimer, the term of this patent is extended or adjusted under 35 U.S.C. 154(b) by 439 days.

(21) Appl. No.: 12/267,077

(22) Filed: Nov. 7, 2008

(65) Prior Publication Data

US 2009/0128827 A1    May 21, 2009

Related U.S. Application Data

(60) Provisional application No. 60/987,690, filed on Nov. 13, 2007.

(51) Int. Cl.
*G01B 9/02* (2006.01)
*G02B 21/00* (2006.01)

(52) U.S. Cl. .................... 356/495; 359/371

(58) Field of Classification Search .......... 356/492, 356/495, 511; 359/370, 371
See application file for complete search history.

(56) References Cited

U.S. PATENT DOCUMENTS

| | | |
|---|---|---|
| 2,612,074 A | 9/1952 | Mirau |
| 4,188,122 A | 2/1980 | Massie et al. |
| 4,199,219 A | 4/1980 | Suzki et al. |
| 4,340,306 A | 7/1982 | Balasubramanian |
| 4,355,903 A | 10/1982 | Sandercock |
| 4,523,846 A | 6/1985 | Breckinridge et al. |
| 4,576,479 A | 3/1986 | Downs |
| 4,583,858 A | 4/1986 | Lebling et al. |
| 4,618,262 A | 10/1986 | Maydan et al. |
| 4,639,139 A | 1/1987 | Wyant et al. |
| 4,660,980 A | 4/1987 | Takabayashi et al. |
| 4,710,642 A | 12/1987 | McNeil |
| 4,714,348 A * | 12/1987 | MaKosch ............... 356/495 |
| 4,802,765 A * | 2/1989 | Young et al. ........... 356/487 |
| 4,806,018 A | 2/1989 | Falk |
| 4,818,110 A | 4/1989 | Davidson |
| 4,869,593 A | 9/1989 | Biegen |
| 4,923,301 A | 5/1990 | White |
| 4,948,253 A | 8/1990 | Biegen |
| 4,964,726 A | 10/1990 | Kleinknecht et al. |
| 4,999,014 A | 3/1991 | Gold et al. |
| 5,042,949 A | 8/1991 | Greenberg et al. |

(Continued)

FOREIGN PATENT DOCUMENTS

DE    4108944    9/1992

(Continued)

OTHER PUBLICATIONS

Abdulhalim, "Spectroscopic interference microscopy technique for measurement of layer parameters", Meas. Sci. Technol., vol. 12, pp. 1996-2001 (2001).

(Continued)

*Primary Examiner* — Michael A Lyons
(74) *Attorney, Agent, or Firm* — Fish & Richardson P.C.

(57) ABSTRACT

In one aspect, the disclosure features methods that include using a microscope to direct light to a test object and to direct the light reflected from the test object to a detector, where the light includes components having orthogonal polarization states, varying an optical path length difference (OPD) between the components of the light, acquiring an interference signal from the detector while varying the OPD between the components, and determining information about the test object based on the acquired interference signal.

49 Claims, 7 Drawing Sheets

U.S. PATENT DOCUMENTS

| | | |
|---|---|---|
| 5,042,951 A | 8/1991 | Gold et al. |
| 5,073,018 A | 12/1991 | Kino et al. |
| 5,112,129 A | 5/1992 | Davidson et al. |
| 5,129,724 A | 7/1992 | Brophy et al. |
| 5,133,601 A | 7/1992 | Cohen et al. |
| 5,135,307 A | 8/1992 | de Groot et al. |
| 5,153,669 A | 10/1992 | DeGroot |
| 5,164,790 A | 11/1992 | McNeil et al. |
| 5,166,751 A | 11/1992 | Massig |
| 5,173,746 A | 12/1992 | Brophy |
| 5,194,918 A | 3/1993 | Kino et al. |
| 5,241,369 A | 8/1993 | McNeil et al. |
| 5,301,010 A | 4/1994 | Jones et al. |
| 5,355,221 A | 10/1994 | Cohen et al. |
| 5,384,717 A | 1/1995 | Ebenstein |
| 5,386,119 A | 1/1995 | Ledger |
| 5,390,023 A | 2/1995 | Biegen |
| 5,398,113 A | 3/1995 | de Groot |
| 5,402,234 A | 3/1995 | Deck |
| 5,459,564 A | 10/1995 | Chivers |
| 5,471,303 A | 11/1995 | Ai et al. |
| 5,481,811 A | 1/1996 | Smith |
| 5,483,064 A | 1/1996 | Frey et al. |
| 5,539,517 A | 7/1996 | Cabib et al. |
| 5,543,841 A | 8/1996 | Kanamori |
| 5,555,471 A | 9/1996 | Xu et al. |
| 5,587,792 A | 12/1996 | Nishizawa et al. |
| 5,589,938 A | 12/1996 | Deck |
| 5,602,643 A | 2/1997 | Barrett |
| 5,633,714 A | 5/1997 | Nyyssonen |
| 5,640,270 A | 6/1997 | Aziz et al. |
| 5,703,692 A | 12/1997 | McNeil et al. |
| 5,757,502 A | 5/1998 | Weling |
| 5,774,224 A | 6/1998 | Kerstens |
| 5,777,740 A | 7/1998 | Lacey et al. |
| 5,777,742 A | 7/1998 | Marron |
| 5,784,164 A | 7/1998 | Deck et al. |
| 5,856,871 A | 1/1999 | Cabib et al. |
| 5,867,276 A | 2/1999 | McNeil et al. |
| 5,880,838 A | 3/1999 | Marx et al. |
| 5,900,633 A | 5/1999 | Solomon et al. |
| 5,912,741 A | 6/1999 | Carter et al. |
| 5,923,423 A | 7/1999 | Sawatari et al. |
| 5,943,134 A | 8/1999 | Yamaguchi et al. |
| 5,953,124 A | 9/1999 | Deck |
| 5,956,141 A | 9/1999 | Hayashi |
| 5,959,735 A | 9/1999 | Maris et al. |
| 5,963,329 A | 10/1999 | Conrad et al. |
| 6,028,670 A | 2/2000 | Deck |
| 6,160,621 A | 12/2000 | Perry et al. |
| 6,172,452 B1 | 1/2001 | Itaya et al. |
| 6,222,632 B1 * | 4/2001 | Bakin ............... 356/453 |
| 6,242,739 B1 | 6/2001 | Cherkassky |
| 6,249,351 B1 | 6/2001 | de Groot |
| 6,259,521 B1 | 7/2001 | Miller et al. |
| 6,275,297 B1 | 8/2001 | Zalicki |
| 6,377,349 B1 | 4/2002 | Fercher |
| 6,381,009 B1 | 4/2002 | McGahan |
| 6,392,749 B1 | 5/2002 | Meeks et al. |
| 6,417,109 B1 | 7/2002 | Jordan et al. |
| 6,429,943 B1 | 8/2002 | Opsal et al. |
| 6,449,048 B1 | 9/2002 | Olszak |
| 6,449,066 B1 | 9/2002 | Arns et al. |
| 6,483,580 B1 | 11/2002 | Xu et al. |
| 6,500,591 B1 | 12/2002 | Adams |
| 6,507,405 B1 | 1/2003 | Grek et al. |
| 6,525,825 B2 | 2/2003 | de Groot et al. |
| 6,545,761 B1 | 4/2003 | Aziz et al. |
| 6,545,763 B1 | 4/2003 | Kim et al. |
| 6,590,656 B2 | 7/2003 | Xu et al. |
| 6,597,460 B2 | 7/2003 | Groot et al. |
| 6,611,330 B2 | 8/2003 | Lee et al. |
| 6,624,894 B2 | 9/2003 | Olszak et al. |
| 6,633,389 B1 | 10/2003 | Poris et al. |
| 6,633,831 B2 | 10/2003 | Nikoonahad et al. |
| 6,636,322 B1 | 10/2003 | Terashita |
| 6,694,284 B1 | 2/2004 | Nikoonahad et al. |
| 6,714,307 B2 | 3/2004 | de Groot et al. |
| 6,721,094 B1 | 4/2004 | Sinclair et al. |
| 6,741,357 B2 | 5/2004 | Wang et al. |
| 6,741,360 B2 | 5/2004 | D'Agraives et al. |
| 6,775,006 B2 | 8/2004 | Groot et al. |
| 6,775,009 B2 | 8/2004 | Hill |
| 6,822,745 B2 | 11/2004 | De Groot et al. |
| 6,856,384 B1 | 2/2005 | Rovira |
| 6,888,638 B1 | 5/2005 | Hill |
| 6,891,627 B1 | 5/2005 | Levy et al. |
| 6,909,509 B2 | 6/2005 | DeGroot |
| 6,925,860 B1 | 8/2005 | Poris et al. |
| 6,940,604 B2 | 9/2005 | Jung et al. |
| 6,956,658 B2 | 10/2005 | Meeks et al. |
| 6,956,660 B2 | 10/2005 | Meeks et al. |
| 6,985,232 B2 | 1/2006 | Sezginer |
| 6,989,905 B2 | 1/2006 | De Groot |
| 6,999,180 B1 | 2/2006 | Janik et al. |
| 7,012,700 B2 | 3/2006 | de Groot et al. |
| 7,018,271 B2 | 3/2006 | Wiswesser et al. |
| 7,038,850 B2 | 5/2006 | Chang et al. |
| 7,046,371 B2 | 5/2006 | de Lega et al. |
| 7,061,623 B2 | 6/2006 | Davidson |
| 7,068,376 B2 | 6/2006 | De Groot |
| 7,088,451 B2 | 8/2006 | Sezginer |
| 7,102,761 B2 | 9/2006 | de Lega et al. |
| 7,106,454 B2 | 9/2006 | De Groot et al. |
| 7,119,909 B2 | 10/2006 | Unruh et al. |
| 7,139,081 B2 | 11/2006 | De Groot |
| 7,139,083 B2 | 11/2006 | Fielden et al. |
| 7,142,311 B2 | 11/2006 | De Lega |
| 7,177,030 B2 | 2/2007 | Leizerson |
| 7,205,518 B2 | 4/2007 | Neuvonen |
| 7,239,398 B2 | 7/2007 | de Groot et al. |
| 7,271,918 B2 | 9/2007 | de Groot et al. |
| 7,283,248 B2 | 10/2007 | Hill |
| 7,289,225 B2 | 10/2007 | de Groot |
| 7,298,494 B2 | 11/2007 | de Groot |
| 7,304,747 B2 | 12/2007 | de Lega |
| 7,315,382 B2 | 1/2008 | de Groot |
| 7,324,210 B2 | 1/2008 | de Groot et al. |
| 7,324,214 B2 | 1/2008 | de Groot et al. |
| 7,428,057 B2 | 9/2008 | De Lega et al. |
| 7,626,706 B2 * | 12/2009 | Kruger et al. ............. 356/495 |
| 2002/0015146 A1 | 2/2002 | Meeks et al. |
| 2002/0135775 A1 | 9/2002 | de Groot et al. |
| 2002/0148955 A1 | 10/2002 | Hill |
| 2002/0196450 A1 | 12/2002 | Olszak et al. |
| 2003/0011784 A1 | 1/2003 | de Groot et al. |
| 2003/0043459 A1 * | 3/2003 | Matsui ............. 359/386 |
| 2003/0048458 A1 | 3/2003 | Mieher et al. |
| 2003/0075721 A1 | 4/2003 | Li |
| 2003/0112444 A1 | 6/2003 | Yang et al. |
| 2003/0137671 A1 | 7/2003 | de Groot et al. |
| 2003/0197871 A1 | 10/2003 | de Groot |
| 2004/0027576 A1 | 2/2004 | de Groot et al. |
| 2004/0075843 A1 | 4/2004 | Marron et al. |
| 2004/0085544 A1 | 5/2004 | de Groot et al. |
| 2004/0185582 A1 | 9/2004 | Kueny |
| 2004/0189999 A1 | 9/2004 | de Groot et al. |
| 2004/0233442 A1 | 11/2004 | Mieher et al. |
| 2004/0233444 A1 | 11/2004 | Mieher et al. |
| 2004/0246493 A1 | 12/2004 | Kim et al. |
| 2005/0024773 A1 | 2/2005 | Lille |
| 2005/0057757 A1 | 3/2005 | de Lega et al. |
| 2005/0068540 A1 | 3/2005 | de Groot et al. |
| 2005/0073692 A1 | 4/2005 | de Groot et al. |
| 2005/0078318 A1 | 4/2005 | de Groot |
| 2005/0078319 A1 | 4/2005 | de Groot |
| 2005/0088663 A1 | 4/2005 | de Groot et al. |
| 2005/0146727 A1 | 7/2005 | Hill |
| 2005/0179911 A1 | 8/2005 | Boomgarden et al. |
| 2005/0225769 A1 | 10/2005 | Bankhead et al. |
| 2005/0237534 A1 | 10/2005 | Deck |
| 2005/0237537 A1 | 10/2005 | Leizerson et al. |
| 2006/0012582 A1 | 1/2006 | de Lega |
| 2006/0072104 A1 | 4/2006 | Engel et al. |
| 2006/0119841 A1 | 6/2006 | Saunders et al. |
| 2006/0158657 A1 | 7/2006 | de Lega et al. |
| 2006/0158658 A1 | 7/2006 | de Lega et al. |

| | | | |
|---|---|---|---|
| 2006/0158659 | A1 | 7/2006 | de Lega et al. |
| 2006/0170932 | A1 | 8/2006 | Hayashi et al. |
| 2006/0187465 | A1 | 8/2006 | de Groot |
| 2006/0262321 | A1 | 11/2006 | de Groot |
| 2007/0008551 | A1 | 1/2007 | Tang |
| 2007/0024863 | A1* | 2/2007 | Kadowaki et al. ............ 356/498 |
| 2007/0046953 | A1 | 3/2007 | de Groot et al. |
| 2007/0081167 | A1 | 4/2007 | de Groot et al. |
| 2007/0086013 | A1 | 4/2007 | de Lega et al. |
| 2007/0091317 | A1 | 4/2007 | Freischlad et al. |
| 2007/0091318 | A1 | 4/2007 | Freischlad et al. |
| 2007/0091940 | A1 | 4/2007 | Jameson |
| 2007/0097380 | A1 | 5/2007 | de Groot et al. |
| 2007/0127036 | A1 | 6/2007 | Liao et al. |
| 2007/0139656 | A1 | 6/2007 | Wan |
| 2007/0247637 | A1 | 10/2007 | de Groot et al. |
| 2008/0018901 | A1 | 1/2008 | de Groot |
| 2008/0088849 | A1 | 4/2008 | de Lega et al. |
| 2008/0174784 | A1 | 7/2008 | de Lega et al. |

FOREIGN PATENT DOCUMENTS

| | | |
|---|---|---|
| DE | 4309056 | 9/1994 |
| EP | 0 397 388 | 11/1990 |
| EP | 0 549 166 | 6/1993 |
| EP | 0 617 255 | 9/1994 |
| EP | 0 929 094 | 7/1999 |
| GB | 2385417 | 8/2003 |
| JP | 63-37202 | 2/1988 |
| JP | 8327327 | 12/1996 |
| JP | 09-218016 | 8/1997 |
| JP | 9-297004 | 11/1997 |
| JP | 10-89912 | 4/1998 |
| JP | 2000121317 | 4/2000 |
| JP | 2000-180124 | 6/2000 |
| JP | 2001-141652 | 5/2001 |
| JP | 2001-272603 | 10/2001 |
| JP | 2007-121499 | 5/2007 |
| KR | 10-0701974 | 3/2007 |
| WO | WO 93/24805 | 12/1993 |
| WO | WO 95/09343 | 4/1995 |
| WO | WO 97/44633 | 11/1997 |
| WO | WO 02/082008 | 10/2002 |
| WO | 03/036229 | 5/2003 |
| WO | WO 03/062802 | 7/2003 |
| WO | WO 2004/023071 | 3/2004 |
| WO | 2005/029192 | 3/2005 |

OTHER PUBLICATIONS

Akcay, C. et al., "Spectral shaping to improve the point spread function in optical coherence tomography", Optics Letters, vol. 28, No. 20, pp. 1921-1923 (Oct. 15, 2003).

Azzam, R.M.A. et al, "Ellipsometric function of a film-substrate system: Applications to the design of reflection-type optical devices and to ellipsometry", Journal of the Optical Society of America, vol. 5, No. 3, pp. 252-260 (1975).

Azzam, R.M.A. et al., "Reflection and Transmission of Polarized Light by Stratified Planar Structures", Ellipsometry and Polarized Light, Elsevier Science B.V. ISBN 0 444 87016 4 (Paperback) pp. 267-363 (1987).

Bashkansky, M. et al., "Signal Processing for Improving Field Cross-correlation Function in Optical Coherence Tomography", Supplement to Optics & Photonics News, 9(5) (May 1998).

Berman et al., "Review of In Situ & In-line Detection for CMP Applications", Semiconductor Fabtech—8.sup.th Edition, pp. 267-274.

Biegen, "Determination of the Phase Change on Reflection from Two-beam Interference," Optics Letters, 19:21:1690-1692, Nov. 1, 1994.

Bosseboeuf, A. et al., "Application of microscopic interferometry techniques in the MEMS field", Proc. SPIE, 5145, pp. 1-16 (2003).

Chim, S. S. C. and Kino, G. S., "Three-Dimensional Image Realization in Interference Microscopy", Applied Optics, May 10, 1992, vol. 31, No. 14.

Creath, Katherine, "Step height measurement using two-wavelength phase-shifting interferometry", Applied Optics, vol. 26, No. 14, pp. 2810-2816 (Jul. 15, 1987).

Danielson et al., "Absolute Optical Ranging Using Low Coherence Interferometry," Applied Optics, 30:21:2975-2979, Jul. 20, 1991.

Davidson, M. et al., "An Application of Interference Microscopy to Integrated Circuit Inspection and Metrology", Proceedings of SPIE, vol. 775, pp. 233-247 (1987).

de Groot et al., "Angle-resolved three-dimensional analysis of surface films by coherence scanning interferometry", Optics Letters, vol. 32, No. 12, pp. 1638-1640 (Jun. 15, 2007).

de Groot et al.; "Three-dimensional imaging by sub-Nyquist sampling of white-light interfergrams"; Optics Letters vol. 18, No. 17; pp. 1462-1464, Sep. 1, 1993.

de Groot, P. et al., "Determination of fringe order in white-light interference microscopy", Appl. Opt., 41(22) pp. 4571-4578 (2002).

de Groot, P. et al., "Signal modeling for low coherence height-scanning interference microscopy", Applied Optics, vol. 43 No. 25, pp. 4821-4830 (Sep. 1, 2004).

de Groot, P. et al., "Signal modeling for modern interference microscopes", SPIE Proceedings vol. 5457, pp. 26-34 (2004).

de Groot, P., "Extending the unambiguous range of two-color interferometers", Applied Optics, vol. 33, No. 25, pp. 5948-5953 (Sep. 1, 1994).

de Groot, P., "Derivation of algorithms for phase-shifting interferometry using the concept of a data-sampling window", Appl. Opt., 34(22), p. 4723-4730 (1995).

de Groot, P., "Phase-shift calibration errors in interometers with spherical Fizeua cavities," Applied Optics, vol. 34:16, pp. 2856-2863 (Jun. 1, 1995).

de Groot, P., "Three-color laser-diode interferometer", Applied Optics, vol. 30, No. 25, pp. 3612-3616 (Sep. 1, 1991).

de Lega, X., et al., "Optical topography measurement of patterned wafers," American Institute of Physics Conference Proceedings, vol. 788, pp. 432-436 (2005).

Deck, L. et al., "Two-color light-emitting-diode source for high-precision phase-shifting interferometry", Optics Letters, vol. 18, No. 22, pp. 1899-1901 (Nov. 15, 1993).

Dresel et al., "Three Dimensional Sensing of Rough Surfaces by Coherence Radar," Applied Optics, 31:7:919-925, Mar. 1, 1992.

Feke, Gilbert D. et al., "Interferometric back focal plane microellipsometry", Applied Optics, vol. 37, No. 10, pp. 1796-1802 (Apr. 1, 1998).

Flournoy, P.A. et al., "White-light interferometric thickness gauge", Appl. Opt., 11(9), pp. 1907-1915 (1972).

Gale, D.M. et al., "Linnik microscope imaging of integrated circuit structures", Applied Optics vol. 35, No. 1, pp. 131-148 (Jan. 1, 1996).

Ghiglia, Dennis C. et al., "Quality-Guided Path Following", Two-Dimensional Phase Unwrapping—Theory, Algorithms and Software, John Wiley & Sons publishers, ISBN 0-471-24935-1, pp. 122-136 (1998).

Hausler, G. et al., "Coherence Radar and Spectral Radar—New Tools for Dermatological Diagnosis", Journal of Biomedical Optics, vol. 3, No. 1, pp. 21-31 (Jan. 1998).

Hecht, "Basics of Coherence Theory," Optics, 2nd Ed., Addison Wesley, pp. 516-517 (1987).

Holmes, R.D. et al., "Scanning microellipsometry for extraction of true topography", Electronics Letters, vol. 31, No. 5, pp. 358-359 (Mar. 2, 1995).

J.E. Greivenkamp, "Generalized data reduction for heterodyne interferometry", Opt. Eng., vol. 23 No. 4, pp. 350-352 (Jul./Aug. 1984).

Kim, Seung-Woo et al., "Thickness-profile measurement of transparent thin-film layers by white-light scanning interferometry", Applied Optics, vol. 38, No. 28, pp. 5968-5973 (Oct. 1, 1999).

Kino et al., "Mirau Correlation Microscope," Applied Optics, 29:26:3775-3783, Sep. 10, 1990.

Kohlhaas, A. Fromchen, C. and Brinkmeyer, E., "High-Resolution OCDR for Testing Integrated-Optical Waveguides: Dispersion-Corrupted Experimental Data Corrected by a Numerical Algorithm", Journal of Lightwave Technology, Nov. 1991, vol. 9, No. 11.

Kujawinska, Malgorzata, "Spatial Phase Measurement Methods", Interferogram Analysis: Digital Fringe Pattern Measurement Techniques, IOP Publishing Ltd. 1993, pp. 141-193.

Larkin, Kieran G., "Efficient nonlinear algorithm for envelope detection in white light interferometry", J. Opt. Soc. Am A4, pp. 832-843 (1996).

Lee et al., "Profilometry with a coherence scanning microscope", Appl. Opt., 29(26), pp. 3784-3788 (1990).

Lee-Bennett, I., "Advances in non-contacting surface metrology", OF&T Workshop, paper OTuC1 (2004).

Leonhardt, K. et al., "Micro-Ellipso-Height-Profilometry", Optics Communications, vol. 80, No. 3, 4, pp. 205-209 (Jan. 1, 1991).

Liu, Y. et al., "Common path interferometric microellipsometry", SPIE, vol. 2782, pp. 635-645 (1996).

Lyakin et al., "The interferometric system with resolution better than coherence length for determination of geometrical thickness and refractive index of a layer object", Proceedings of the SPIE—The International Society for Optical Engineering SPIE-INT, Soc. Opt. Eng USA, vol. 4956, pp. 163-169 (Jul. 2003).

Morgan, C.J., "Least-Squares estimation in phase-measurement interferometry", Apt. Let., 7(8), pp. 368-370 (1982).

Ngoi et al., "Phase-shifting interferometry immune to vibration", Applied Optics, vol. 40, No. 19, pp. 3211-3214 (2001).

Novak et al., "Template-based software for accurate MEMS characterization", Proceedings of SPIE, Fol. 4980, pp. 75-80 (2003).

Onodera, Ribun et al., "Two-wavelength interferometry that uses a Fourier-transform method", Applied Optics, vol. 37, No. 34, pp. 7988-7994 (Dec. 1, 1998).

Oppenheim, A.V. et al., "10.3: The time-dependent Fourier Transform", Discrete-Time Signal Processing, 2.sup.nd Edition, pp. 714-722 (Prentice Hall, New Jersey, 1999).

Park et al., "Direct Quadratic Polynomial Fitting for Fringe Peak Detection of White Light Scanning Interferograms," Opt. Eng., 39:4:952-959, Apr. 2000.

Pfortner, Andreas et al., "Red-green-blue interferometer for the metrology of discontinuous structures", Applied Optics, vol. 42, No. 4, pp. 667-673 (Feb. 1, 2003).

Pluta, Maksymilian, "Advanced Light Microscopy", vol. 3, (Elsevier, Amsterdam, 1993) pp. 265-271.

Press, W.H. et al., "Linear Correlation", Numerical Recipes in C, Cambridge University Press, 2.sup.nd Edition, pp. 636-639 (1992).

Rosencwaig, Allan et al., "Beam profile reflectometry: A new technique for dielectric film measurements", Applied Physics Letters, vol. 60, No. 11, pp. 1301-1303 (Mar. 16, 1992).

Sandoz, P. et al., "High-resolution profilometry by using phase calculation algorithms for spectroscopic analysis of white-light interferograms", Journal of Modern Optics, vol. 43, No. 4, pp. 701-708 (1996).

Sandoz, P. et al., "Optical implementation of frequency domain analysis for white light interferometry", Proceedings SPIE, vol. 2545, pp. 221-228 (Jun. 1995).

Sandoz, P. et al., "Processing of white light correlograms: simultaneous pahse and envelope measurements by wavelet transformation", SPIE, 3098, pp. 73-82 (1997).

Sandoz, Patrick "Wavelet transform as a processing tool in white-light interferometry", Optics Letters, vol. 22, No. 14, pp. 1065-1067 (Jul. 15, 1997).

Schmit, J. et al., "Extended averaging technique for derivation of error-compensating algorithms in phase-shifting interferometry," Applied Optics, vol. 34:19, pp. 3610-3619 (Jul. 1, 1995).

Schnell, U. et al., "Dispersive white-light interferometry for absolute distance measurement with dielectric multilayer systems on the target", Optics Letters, vol. 21, No. 7, pp. 528-530 (Apr. 1996).

Schwider, J. et al., "Dispersive interferometric profilometer", Optics Letters, vol. 19, No. 13, pp. 995-997 (Jul. 1994).

See et al , Scanning optical microellipsometer for pure surface profiling, Applied Optics, Dec. 1996, pp. 6663-6668.

Shatalin, S. V. et al., "Reflection conoscopy and micro-ellipsometry of isotropic thin film structures", Journal of Microscopy, vol. 179, Part 3, pp. 241-252 (Sep. 1995).

Sheppard et al., "Effect of numerical aperture on interference fringe spacing", Applied Optics, vol. 34, No. 22, pp. 4731-4734 (Aug. 1, 1995).

Totzeck, M., "Numerical simulation of high-NA quantitative polarization microscopy and corresponding near-fields", Optik, vol. 112, No. 9, pp. 399-406 (2001).

Tripathi, R. et al., "Spectral shaping for non-Gaussian source spectra in optical coherence tomography", Optics Letters, vol. 27, No. 6, pp. 406-408 (2002).

Tzannes, A.P. et al., "Measurement of the modulation transfer function of infrared cameras," Optical Engineering, vol. 34, No. 6, pp. 1808-1817 (Jun. 1995).

Willenborg, D. et al, "A novel micro-spot dielectric film thickness measurement system", SPIE, vol. 1594, pp. 322-333 (1991).

Wyant, "Phase shifting interferometry" (1998).

Youngquist, R. C. Carr, S. and Davies, D. E. N., "Optical Coherence-Domain Reflectometry: a New Optical Evaluation Technique", Optical Letters, Mar. 1987, vol. 12, No. 3.

International Search Report dated May 19, 2009 corresponding to Int'l. Appln. No. PCT/US2008/082785.

Office Action for Japanese Patent Appln. No. 2010-534108, dated Apr. 26, 2011.

* cited by examiner

Phase

Intensity

INTERFEROMETER UTILIZING POLARIZATION SCANNING

CROSS-REFERENCE TO RELATED APPLICATIONS

This application is a claims priority to Provisional Patent Application No. 60/987,690, entitled "INTERFEROMETER UTILIZING POLARIZATION SCANNING," filed on Nov. 13, 2007, the entire contents of which is incorporated herein by reference.

TECHNICAL FIELD

The disclosure relates generally to methods for analyzing surface structure characteristics, including for example film thickness, material composition, and optically unresolved surface structure.

BACKGROUND

Interferometric techniques are commonly used to measure the profile of a surface of an object. To do so, an interferometer combines a measurement wavefront reflected from the surface of interest with a reference wavefront reflected from a reference surface to produce an interferogram. Fringes in the interferogram are indicative of spatial variations between the surface of interest and the reference surface.

A scanning interferometer scans the optical path length difference (OPD) between the reference and measurement legs of the interferometer over a range comparable to, or larger than, the coherence length of the interfering wavefronts to produce a scanning interferometry signal for each camera pixel used to measure the interferogram. A limited coherence length can be produced, for example, by using a white-light source. Commonly, low-coherence scanning interferometry is referred to as scanning white light interferometry (SWLI). A SWLI-signal is a few fringes localized near the zero OPD position. The signal is typically characterized by a sinusoidal carrier modulation (i.e., fringes) with bell-shaped fringe-contrast envelope. The conventional idea underlying SWLI metrology is to make use of the localization of the fringes to measure surface profiles.

SWLI processing techniques include two principle trends. The first approach is to locate the peak or center of the envelope, assuming that this position corresponds to the zero optical path length difference of a two-beam interferometer for which one beam reflects from the object surface. The second approach is to transform the signal into the frequency domain and calculate the rate of change of phase with wavelength, assuming that an essentially linear slope is directly proportional to object position. See, for example, U.S. Pat. No. 5,398,113 to Peter de Groot. This latter approach is referred to as Frequency Domain Analysis (FDA).

Scanning interferometry can be used to measure surface topography and/or other characteristics of objects having complex surface structures, such as thin film(s), discrete structures of dissimilar materials, or discrete structures that are under-resolved by the optical resolution of an interference microscope. Such measurements are relevant, e.g., to the characterization of flat panel display components, semiconductor wafer metrology, and in-situ thin film and dissimilar materials analysis. See, e.g., U.S. Patent Publication No. US-2004-0189999-A1 by Peter de Groot et al. entitled "Profiling Complex Surface Structures Using Scanning Interferometry" and published on Sep. 30, 2004, the contents of which are incorporated herein by reference, and U.S. Pat. No. 7,139,081 by Peter de Groot entitled "Interferometry Method for Ellipsometry, Reflectometry, and Scatterometry Measurements, Including Characterization of Thin Film Structures" and issued on Nov. 21, 2006, the contents of which are incorporated herein by reference.

Other techniques for optically determining information about an object include ellipsometry and reflectometry. Ellipsometry determines complex reflectivity of a surface when illuminated at an oblique angle, e.g. 60°, sometimes with a variable angle or with multiple wavelengths. To achieve greater resolution than is readily achievable in a conventional ellipsometer, microellipsometers measure phase and/or intensity distributions in the back focal plane of the objective, also known as the pupil plane, where the various illumination angles are mapped into field positions. Such devices are modernizations of traditional polarization microscopes or "conoscopes," linked historically to crystallography and mineralogy, which employ crossed polarizers and a Bertrand lens to analyze birefringent materials by imaging the pupil plane.

Conventional techniques used for surface characterization (e.g., ellipsometry and reflectometry) rely on the fact that the complex reflectivity of an unknown optical interface depends both on its intrinsic characteristics (e.g., material properties and thickness of individual layers) and on three properties of the light that is used for measuring the reflectivity: wavelength, angle of incidence, and polarization state. In practice, characterization instruments record reflectivity fluctuations resulting from varying these parameters over known ranges.

Optimization procedures such as least-squares fits are then used to get estimates for the unknown parameters by minimizing the difference between measured reflectivity data and a reflectivity function derived from a model of the optical, structure. These derived candidate solutions are often calculated in advance and stored in a library, which is searched to determine the correct solution by a least-squares or equivalent matching and interpolation technique. See, for example, K. P. Bishop et al. "Grating line shape characterization using scatterometry," SPIE 1545, 64-73 (1991) and C. J. Raymond et al., "Scatterometry for CD measurements of etched structures," SPIE 2725, 720-728 (1996).

Detailed modeling such as Rigorous Coupled Wave Analysis (RCWA) solves the inverse problem of discovering the feature structure that generates the observed interference signal observed diffraction effects. See, for example, the reference of M. G. Moharam and T. K. Gaylord "Rigorous coupled-wave analysis of planar-grating diffraction," JOSA, 71(7), 811 (1981) and S. S. H. Naqvi et al., "Linewidth measurement of gratings on photomasks: a simple technique," Appl. Opt., 31(10), 1377-1384 (1992).

Analysis of the diffraction patterns from grating test patterns on masks and wafers provides non-contact measurements of linewidth and other feature characteristics associated with process control. See, for example, H. P. Kleinknecht et al., "Linewidth measurement on IC masks and wafers by grating test patterns," Appl Opt. 19(4), 525-533 (1980) and C. J. Raymond, "Scatterometry for Semiconductor Metrology," in Handbook of silicon semiconductor metrology, A. J. Deibold, Ed., Marcel Dekker, Inc., New York (2001).

SUMMARY

As discussed above, characteristics of a test surface can be determined by analyzing the complex reflectivity of the test surface over a range of angles and, optionally, over a range of wavelengths. This can be achieved by introducing a continuously-varying optical path length difference (OPD) between orthogonal polarization states for light that illuminates the test object through a microscope objective. The apparatus images either the pupil plane of the microscope objective or the test object surface onto a camera, which records the result of mixing (interfering) the two polarization states after reflection from the test surface during this OPD scan using a polarization analyzer. Comparison of the received signals with a model of the reflective properties of the test surface for possible structure parameter values, such as film thickness and surface feature shape, yields information about the test object.

In embodiments where the objective's pupil plane is imaged onto the camera, the polarization OPD scan generates, for each camera pixel, a signal containing information about the reflecting properties of the test surface for a specific combination of incident angle and incident polarization corresponding to a specific position in the imaging pupil.

These embodiments can be useful for detailed analysis of a surface structure at a single position on the surface, for example, the thicknesses and refractive indices of a multilayer film stack, or the critical dimensions and shape parameters of optically unresolved features.

In embodiments where the test surface is imaged onto the camera, the camera detects signals that are characteristic of specific points on the test surface, integrated over all angles of incidence and all polarization states. This embodiment can be useful for generating two-dimensional (2D) and three-dimensional (3D) synthetic images of variations in structure across the test surface, for example, the thickness profile of a thin film, or variations in the critical dimensions of optically unresolved features as a function of position on the surface.

The light source may be spectrally broadband (e.g., include energy at multiple wavelengths). In such embodiments, mathematical analysis of the resulting signals acquired over an OPD scan sufficiently large to encompass at least the coherence length of the light source can allow for separation of the signal into multiple composite signals representing specific wavelengths, e.g., by Fourier analysis. This variation allows for detailed information about the test surface reflectivity as a function of wavelength.

The light source may be spatially incoherent, such that the various points in the pupil plane are mutually incoherent as well. Because the signal generation mechanism relies on coherence, only those diffracted beams that originate from the same source point will result in signals recorded by the electronic controller. Thus, for example, in embodiments where the test object diffracts light coming from one point in the illumination to many points in the pupil image, these diffracted beams will not interfere with specular or diffracted beams from other source points in the pupil-plane. This can simplify the modeling problem for analysis of diffracting or scattering surface structures that are poorly resolved or optically unresolved in conventional microscopes.

The polarization OPD scan may be introduced in either the imaging portion or the illumination portion of the microscope. Accordingly, the polarization OPD can be scanned prior to or after the light prior to the light reflects from the test surface. Another possibility is to place the polarization OPD scanner directly in front of the microscope objective, so that both the illumination and imaging light pass through it. In such embodiments, the combination of microscope objective, polarization OPD scanner and polarization analyzer may be packaged into a single subsystem that conveniently replaces the standard imaging objective of a conventional microscope or the conventional interference objective of an interference microscope.

In general, in a first aspect, the invention features methods that include using a microscope to direct light reflected from a test object to a detector, varying an optical path length difference (OPD) between orthogonal polarization states of the light, acquiring a signal from the detector while varying the OPD between the orthogonal polarization states, and determining information about the test object based on the acquired interference signal.

Implementations of the method can include one or more of the following features and/or features of other aspects. For example, determining information can include transforming (e.g., using a Fourier transform) the signal to an inverse OPD domain (e.g., a spatial frequency domain).

Multiple signals can be acquired while varying the OPD between the polarization states, each signal corresponding to a different detector element of the detector. The information about the test object can be determined based on the multiple acquired signals.

The microscope can be configured to image the test object onto the detector. Alternatively, the microscope can be configured to image a pupil plane of the microscope onto the detector.

The optical path length difference between the orthogonal polarization states can be varied by an amount greater than a coherence length of a source that provides the light. For example, for a low coherence source, the optical path length difference can be varied about 2 microns or more (e.g., about 5 microns or more, about 10 microns or more). In some embodiments, the optical path length difference can be varied by 100 microns or less (e.g., about 50 microns or less, about 20 microns or less). The optical path length difference between the orthogonal polarization states can be varied before and/or after the light reflects from the test object.

The light can be provided by a low-coherence source. The light can be broadband light (e.g., have a spectral full width at half maximum of about 5 nm or more, about 10 nm or more, about 50 nm or more, about 100 nm or more). The light can be monochromatic light. The light can be provided by a point source. Alternatively, the light can be provided by a spatially extend source.

The test object can include a surface feature that is unresolved by the microscope and determining information about the test object can include determining information about the optically unresolved surface feature. The information about the optically unresolved surface feature can include a height profile of the surface feature, an etch depth of the surface feature, a step height of the surface feature, a sidewall angle of the surface feature, a pitch of the surface feature, and/or a linewidth of the surface feature. The information about the surface feature can be a critical dimension (CD) of the surface feature.

Determining information about the surface feature can include comparing the interference signal or information derived from the interference signal to a set of modeled signals associated with a set of surface feature models or information derived from the set of modeled interference signals associated with the set of surface feature models. Determining information about the surface feature can include receiving a modeled interference signal or information derived from the modeled interference signal based on a rigorous coupled wave analysis of a model surface feature.

The surface feature can be a diffractive structure. The test object can include a silicon wafer. The test object can include a component of a flat panel display.

In general, in another aspect, the invention features methods that include directing a first beam and a second beam to impinge on a test object, the first and second beams being derived from a common source and having orthogonal polarization states, detecting the first and second beams reflected from the test object using a common detector while varying an optical path length difference between the first and second beams, acquiring a signal corresponding to intensity variations in the detected beams while varying the optical path length difference between the first and second beams, and determining information about the test object based on the acquired interference signal.

Implementations of the method can include one or more of the following features and/or features of other aspects. For example, the first and second beams can impinge on the test object along a common path.

In general, in a further aspect, the invention features an apparatus that includes a microscope configured to direct light to impinge on a test object and to direct light reflected from the test object to a detector, and a polarization optical path length difference scanner positioned configured to vary an optical path length difference (OPD) between orthogonal polarization states of the light directed by the microscope to the detector.

Embodiments of the apparatus can include one or more of the following features and/or can be configured to implement methods of other aspects of the invention. In some embodiments, the apparatus includes an electronic processor coupled to the detector and configured to receive a signal from the detector in response to the varied OPD. The electronic processor can also be also coupled to the polarization OPD scanner and can be configured to co-ordinate the varying of the OPD with the acquisition of the signal by the detector. The electronic processor can be configured to determine information about the test object based on the signal. The electronic processor can be configured to transform the signal to an inverse OPD domain and to determine information about the test object based on the transformed signal. The electronic processor can be coupled to a computer readable medium that stores a library of information related to model surface features of the test object and the electronic processor can be configured to compare the signal or information derived from the signal with the library to determine information about the test object.

The detector can be a pixilated detector and each pixel can be configured to produce a corresponding signal while detecting the light. The microscope can include one or more optical components configured to image a pupil plane of the microscope onto the detector. The one or more optical components can form a Bertrand lens. The microscope can include one or more optical components configured to image the test object onto the detector.

The microscope can include an objective and the polarization OPD scanner can be positioned between the objective and the detector. The microscope can include an analyzer (e.g., a linear polarizer) which polarizes the light reflected from the test object prior to the detector.

The apparatus can include a light source configured to direct light to the microscope. The polarization OPD scanner can be positioned in a path of the light between the light source and the microscope. The light source can be a broadband light source or a monochromatic light source. The light source can be a low coherence light source. The light source can be a point light source or a spatially extended light source.

The polarization OPD scanner can split the light into two separate beams, each having an orthogonal polarization state (e.g., orthogonal linear polarization states), directs the beams along separate paths, where at least one of the paths is a variable path. The polarization OPD scanner can be a mechano-optical polarization OPD scanner. The polarization OPD scanner can be an electrooptical polarization OPD scanner. The polarization OPD scanner can be a magnetooptical polarization OPD scanner.

The apparatus can be set up in a wafer or flat panel display factory and used to as a metrology tool to evaluate various steps in the production of microchips or flat panel displays.

Among other advantages, embodiments can have lower sensitivity to vibrations relative to conventional interference microscopes. For example, embodiments can be insensitive (e.g., to first order) to vibration because, in certain embodiments, both the interfering light beams both reflect from the object surface. Accordingly, embodiments can provide more accurate measurements than conventional interference microscopes when used in environments that expose the microscope to vibrations. Another advantage is that conventional microscopes can be readily adapted to be able to implement the disclosed techniques. For example, a polarization OPD scanner can be added to a microscope in a readily accessible portion of the light path, such as between the light source and the imaging optics.

The details of one or more embodiments of the invention are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Figure 1:
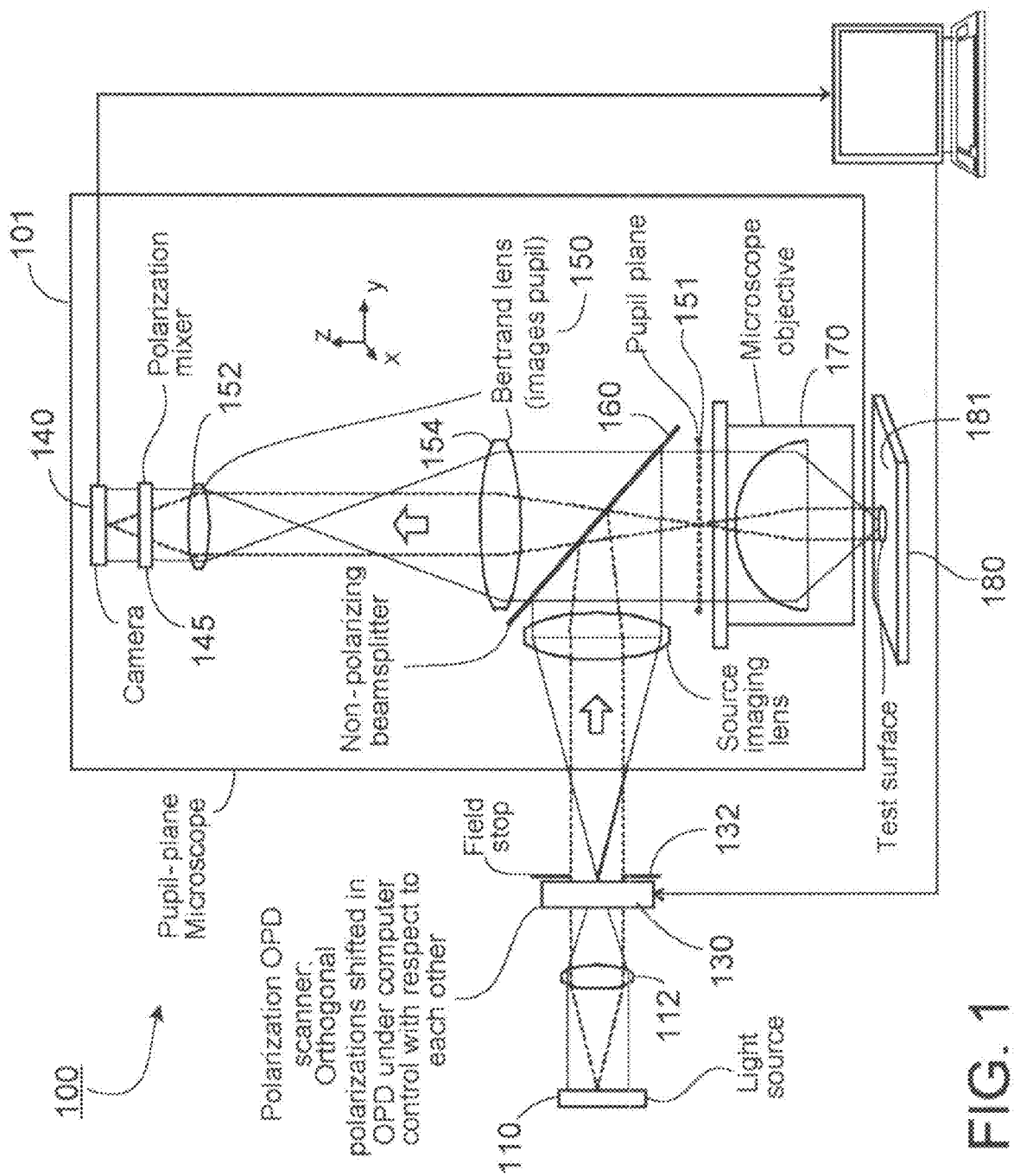
FIG. 1 is a diagram of an embodiment of an interferometry system.

Referring to FIG. 1, a system 100 includes a microscope 101, a broadband, low-coherence light source 110, a polarization optical path length difference (OPD) scanner 130, and an electronic controller 120 (e.g., a computer). Microscope 101 includes an objective 170, a source imaging lens 165, a beam splitter 160, a Bertrand lens 150, and a camera 140 (e.g., a digital camera including an array of pixels). A Cartesian coordinate system is provided for reference.

During operation, light from source 110 is directed via a lens 112 to scanner 130, which varies an OPD between orthogonal polarization states of the light. A field stop 132, positioned between scanner 130 and microscope 101, stops down the light exiting scanner 130, providing a beam of light to microscope 101.

Beam splitter 160 (a non-polarizing beam splitter) directs the light to a test object 180 via objective 170. Accordingly, a surface 181 of test object 180 is illuminated by light having orthogonal linear polarization states. Light reflected by test object 180 returns through objective 170, and is transmitted though bean splitter 160 and Bertrand lens 150 to camera 140. Microscope 101 also includes a polarization mixer 145 (e.g., an analyzer) which is configured to sample the orthogonal polarization states providing a polarized, mixed beam to camera 140. For example, polarization mixer 145 can include an analyzer having a transmission axis oriented at 45' with respect to the orthogonal polarization states of the light reflected from test surface 181.

As illustrated, Bertrand lens 150 includes a first lens 152 and a second lens 154, and is configured to image a pupil plane 151 of objective 170 onto camera 140. Camera 140 and polarization OPD scanner 130 are connected to electronic controller 120. Polarization OPD scanner 130 introduces a variation in the optical path between orthogonal polarization states of the light emitted from light source 110 while electronic controller 120 records camera intensity data. Because each point in the pupil plane represents a specific angle of incidence and a specific polarization orientation for the incident light on surface 181, the polarization scan generates by interference of the polarizations, for each camera pixel, a signal containing information about the reflecting properties of surface 181 for a specific combination of incident angle and incident polarization.

Objective 170 can be a high numerical aperture (NA) objective. For example, objective 170 can have an NA of about 0.4 or more (e.g., 0.5 or more, 0.7 or more). In some embodiments, objective 170 can have an NA of 1 or more (e.g., objective 170 can be used in conjunction with an immersion fluid to increase the NA above 1).

Without wishing to be bound by theory, the resulting signal for a given pixel can be represented mathematically by $$I(x,y,t) = I_x + I_y + \sqrt{I_x I_y} \cos[\theta + \omega t], \quad (1.)$$

where $$I_x = \frac{1}{2}|z_x + z_\perp|^2 \quad (2.)$$

$$I_y = \frac{1}{2}|z_y + z_\perp|^2,$$

$$z_x = r_+ + r_- \cos(2\Omega)$$

$$z_\perp = r_- \sin(2\Omega),$$

$$z_\perp = r_- \sin(2\Omega) \quad (3.)$$

and $$r_- = (-r_p) - r_s$$

$$r_+ = (-r_p) + r \quad (4.)$$

Here $\Omega$ is the azimuthal angle in the pupil plane, and $r_p$ and $r_s$ are the s- and p-polarization reflectivities of the test surface corresponding to the angle of incidence $\phi$. The angular wavenumber $\omega$ is the rate at which the interference fringes pass by. For example, $\omega = \nu 2\pi/\lambda$, where $\nu$ is the rate at which the OPD is varying and $\lambda$ is the wavelength.

Figure 2A:
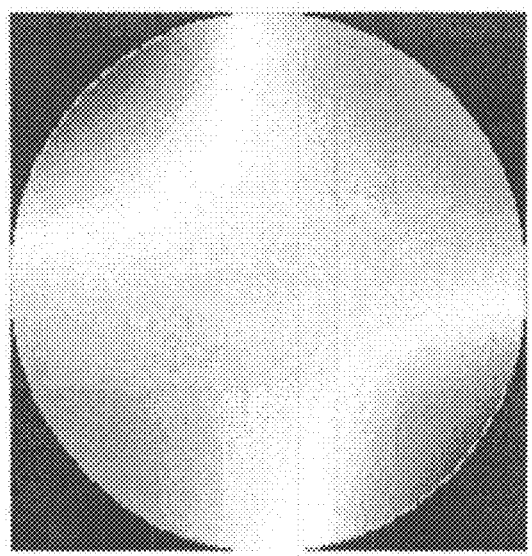
FIGS. 2A and 2B are plots of modeled phase and intensity, respectively, across a pupil plane in an example of an interferometry system.
Figure 2B:
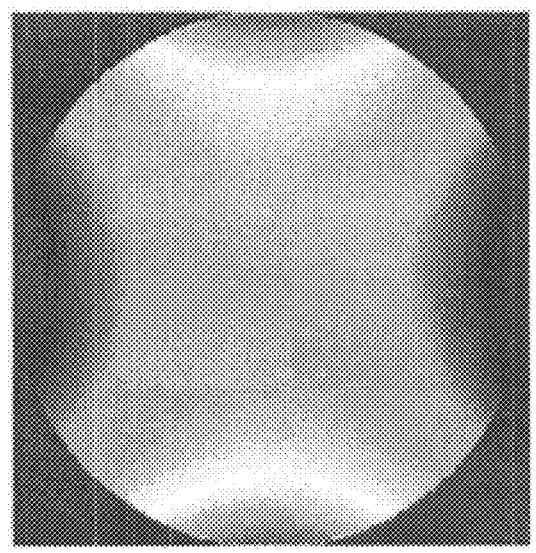

For imaging systems that obey the sine condition, the angle of incidence $\phi$ follows from the position x, y in the pupil plane according to $$\sin[\phi(x, y)] = \frac{\sqrt{x^2 + y^2}}{\rho} NA, \quad (5.)$$

where $\rho$ is the maximum radius of the pupil. The variation in phase $\theta$ and average intensity $I_x + I_y$ across the pupil plane for a silicon carbide surface are shown in FIGS. 2A and 2B, respectively. The phase range is 81 degrees, and the intensity variation across the pupil is 50%. For this data, the NA of objective 170 is 0.8.

After data acquisition, signals can be processed in a number of ways to determine information about the test object. In some embodiments, processing the signal includes transforming the signal for some or all of the signals to an inverse dimension as discussed above. Such transformations can include Fourier transformations of a signal. The signals and transforms may differ from pixel to pixel because of field variations in surface topography, optical system parameters, and/or film thickness, for example. The transformation may be performed during Frequency domain Analysis (FDA) or an extension thereof. Exemplary FDA methods are described in U.S. Pat. No. 5,398,113 entitled "METHOD AND APPARATUS FOR SURFACE TOPOGRAPHY MEASUREMENTS BY SPATIAL-FREQUENCY ANALYSIS OF INTERFEROGRAMS" and U.S. patent application Ser. No. 10/795,808 filed Mar. 8, 2003 and entitled "PROFILING COMPLEX SURFACE STRUCTURES USING HEIGHT SCANNING INTERFEROMETRY," the contents the patent and patent application being incorporated herein by reference. It should be understood, however, that processing a signal does not require transformation. For example, the maximum of an interference envelope can provide information about the test object even without transformation of the signal.

Data analysis can include comparing the signal or information derived from the signal (e.g., a frequency spectrum of the signal) to a pre-existing library of data corresponding to, e.g., known surface structures (e.g., modeled structures or structures whose characteristics have been determined via other techniques, such as scanning probe or electron microscopy). For example, the systems described herein can be used to determine information about optically unresolved surface features of the test object, such as information about an optically unresolved grating, via, trench, or mesa.

Conventional techniques used for surface characterization (e.g., ellipsometry and reflectometry), discussed above, can be applied to the data. For example, optimization procedures (e.g., least-squares fits) can be used to estimate unknown structural parameters of features of the test object by minimizing the difference between measured data and a corresponding function derived from a model of the optical structure, stored in a library.

Figure 3:
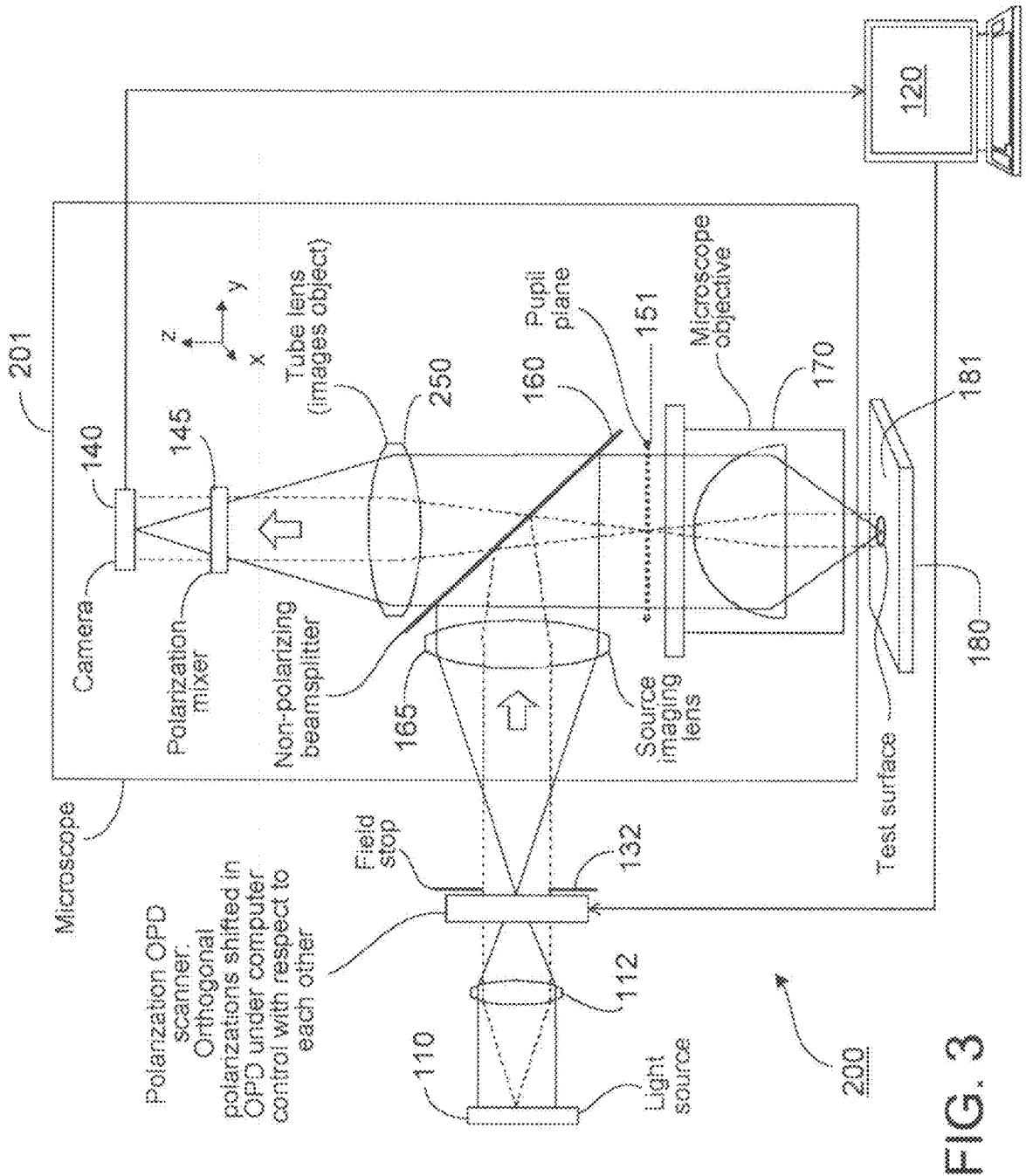
FIG. 3 is a diagram of an embodiment of an interferometry system.

While microscope 101 in system 100 is configured to image a pupil plane onto the camera, other configurations are also possible. For example, in some embodiments, the microscope can be configured to image test surface 181 onto a camera 140. Referring to FIG. 3, for example, shows the system 200 configured in this way. In particular, rather than a Bertrand lens, microscope 101 includes at tube lens 250 which images test surface 181 onto camera 140. Here each camera pixel corresponds to a point on test surface 181.

The polarization OPD scan generates, for each camera pixel, a signal containing information about the reflecting properties of specific points on the test surface integrated over all illumination angles of the objective. Thus for a particular pixel, $$I_{Total}(t) = \int_{x^2+y^2 < NA^2} I_x + I_y + \sqrt{I_x I_y} \cos[\theta + \omega t] dx dy.$$

(6.)

This results in an intensity as a function of time that is characteristic of the optical properties of each specific point on the test object surface. Further details may be gathered optionally by placing, for example, apertures at the pupil plane, so as to e.g., isolate the regions of the pupil and examine how the integrated interference for these regions of the pupil vary with position on the object surface. For example, annular apertures can be used to isolate certain angles of incidents at test surface 181. As another example, dipolar or quadrupolar apertures can be used.

In the systems described above, OPD scanner 130 is positioned in the path of the light between light source 110 and microscope 101. However, other configurations are also possible. For example, referring to FIG. 6, a system 600 can include a polarization OPD scanner 630 in the light path between beam splitter 160 and objective 170. In this configuration, light makes a double pass through the OPD scanner, so that, at least for certain light rays, the optical path length difference between the orthogonal polarization states will be approximately twice the amount of the corresponding polarization OPD scanner positioned where the light makes a single pass through the scanner. While this configuration includes tube lens 250 and is configured to image surface 181 onto camera 140, alternatively the microscope can include a Bertrand lens as shown in system 100, and can be configured to image pupil plane 151 onto camera 140.

In system 600, polarization OPD scanner 130 and polarization mixer 645 are placed just in front of the microscope objective. An advantage of this approach is that several of the apparatus components may be combined in a surface analysis subsystem 601. For example, this subsystem may be made compatible with a conventional microscope or interference microscope platform, thus simplifying implementation of the disclosed techniques. A conventional objective of a microscope can be replaced with the subsystem, for example.

Figure 6:
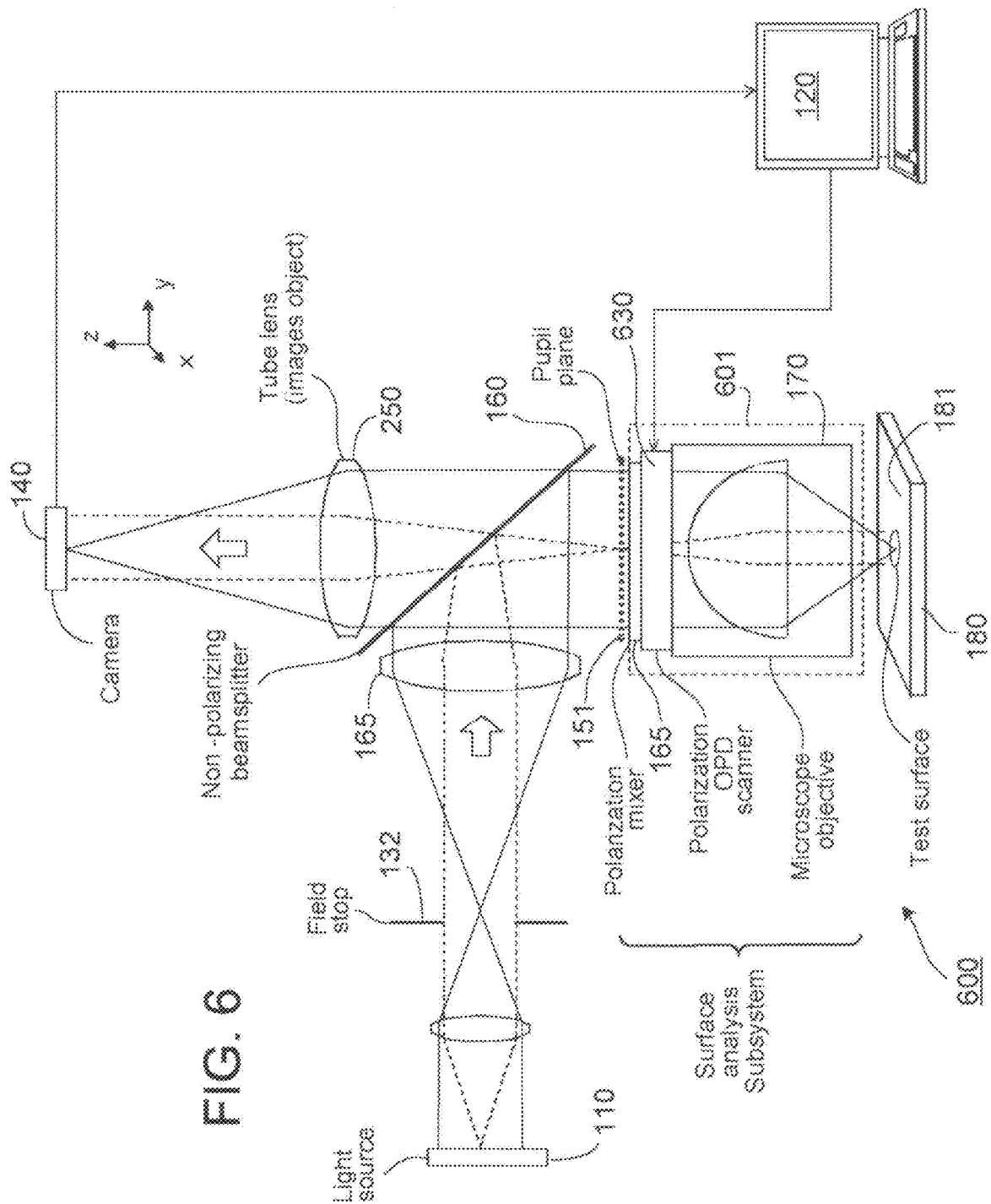
FIG. 6 is a diagram of an embodiment of an interferometry system.

For system 600, in the simplest case of the x, y polarization axes for which the azimuthal angle is Ω=0°, 90°, 180°, 270°, the analysis fix pupil-plane imaging is the same as in Eq. (1). For the other azimuthal angles, the analysis can be more complex because of the double pass but nonetheless provides useful information. In the imaging case, as shown in FIG. 6, the various modulations are integrated in a manner similar to Eq. (6).

Figure 7A:
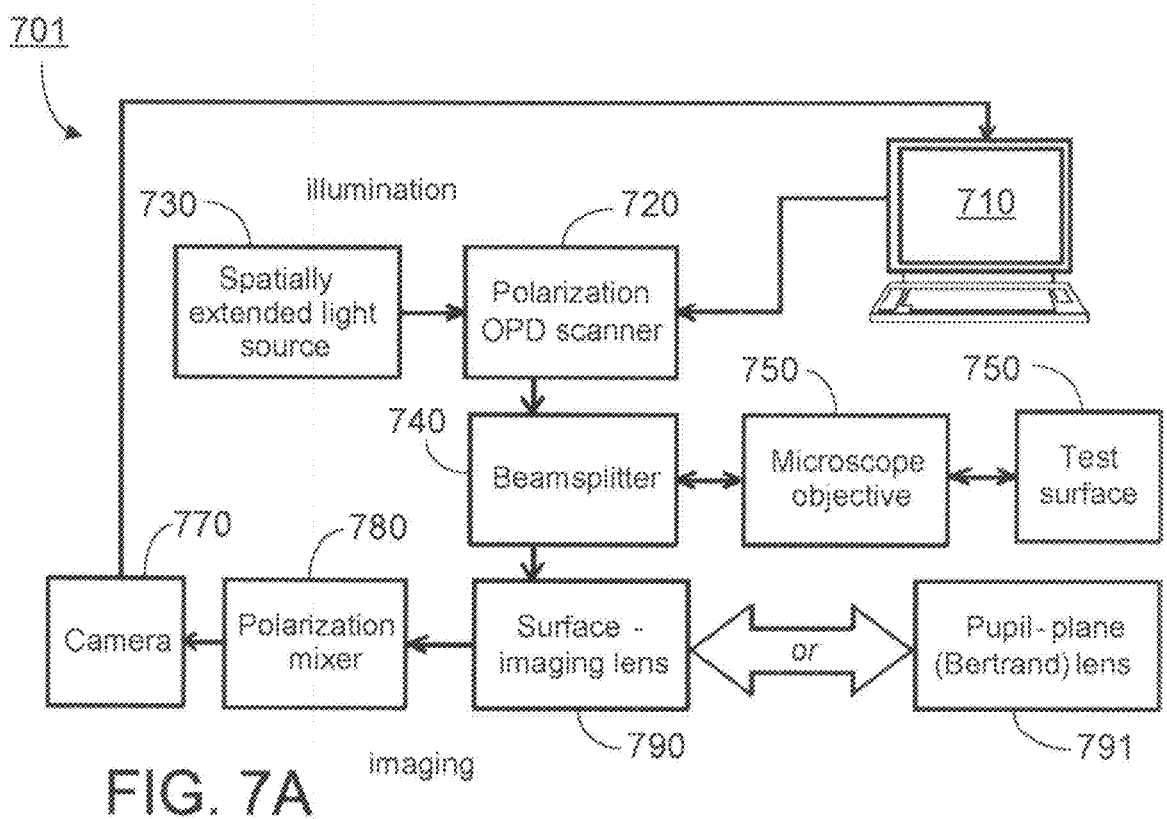
FIG. 7A-7C are schematic diagrams showing embodiments of interferometry systems.
Figure 7B:
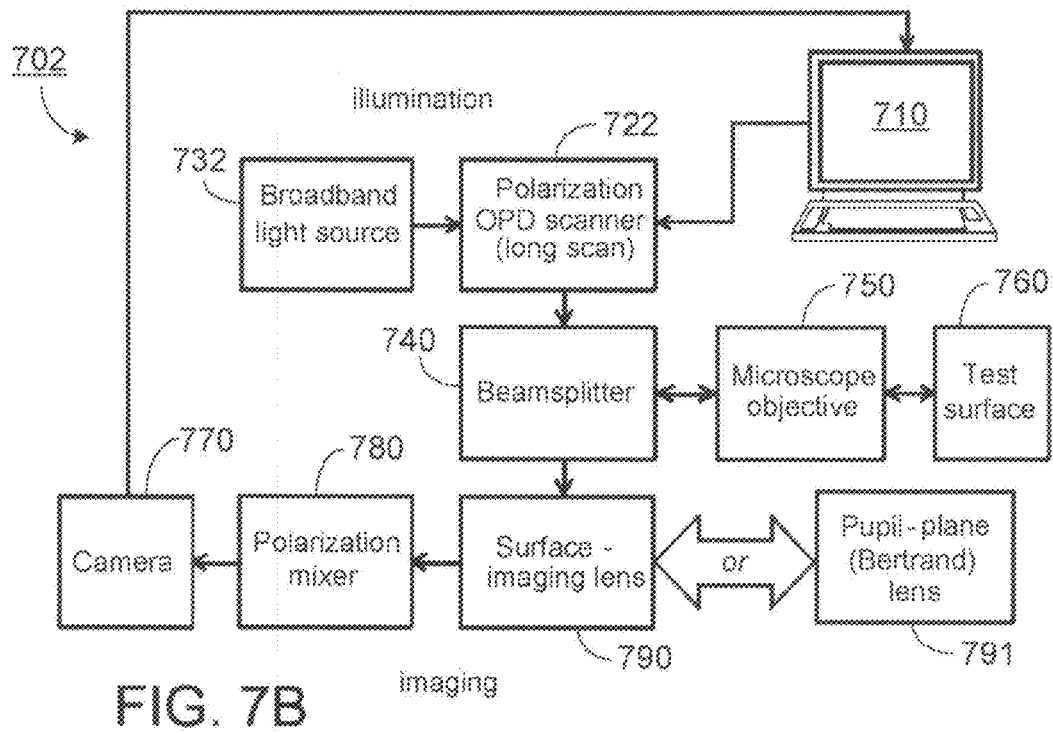
Figure 7C:
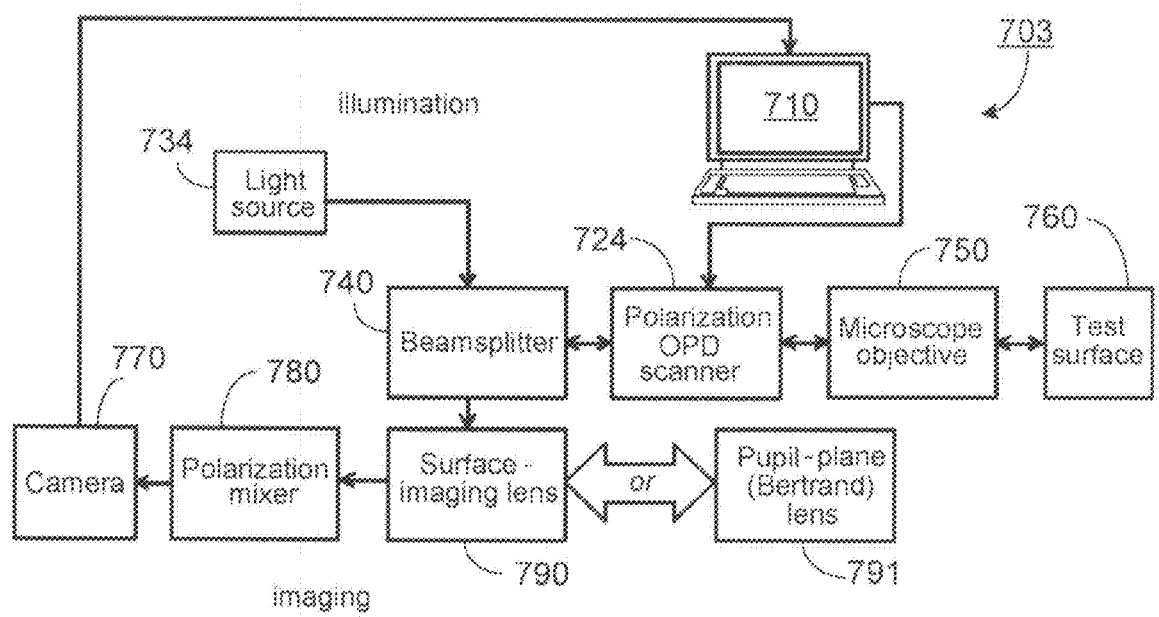

Schematic diagrams of different microscope systems are shown in FIGS. 7A-7C. Specifically, with reference to FIG. 7A, in some embodiments, a microscope system 701 includes an electronic controller 710, a polarization OPD scanner 720, a spatially-extended light source 730, and a beam splitter 740 which directs light from the source via the OPD scanner to a test surface 760 via a microscope objective 750. Light reflected from test surface 760 returns to beam splitter 740 via microscope objective 750 and is directed to a camera 770 via a surface imaging lens 790 and a polarization mixer 780.

Optionally, surface imaging lens 790 can be interchanged with a pupil-plane (e.g., Bertrand) lens 791. Electronic controller 710 is coupled to and controls operation of polarization OPD scanner 720 and camera 770.

Referring to FIG. 7B, another microscope system 702 includes a broadband light source 732 and a long scan polarization OPD scanner 722 in conjunction with the other components of microscope system 701. Here "long scan" means a scan covering a length greater than the coherence length of the light source. For example, a typical white-light source has a coherence length of approximately 2 to 10 microns, with the smaller coherence length corresponding to a broader bandwidth. Accordingly, in some embodiments, a long scan can be in a range from approximately 2 to 10 microns.

Referring to FIG. 7C, a further microscope system 703 includes a light source 734 and a polarization OPD scanner 724 in conjunction with the other components of microscope 701. Here, scanner 724 is arranged in the light path between beam splitter 740 and objective 750, rather than between the light source and beam splitter 740.

The polarization OPD scanner can be positioned at other locations of the microscope systems described above. For example, in some embodiments, the polarization OPD scanner can be positioned between beam splitter 740 and camera 770.

In general, a variety of different types of light sources can be used for light source 30 110. For example, light source 110 can be a broadband source (e.g., a broadband LED source, a fluorescent source, an incandescent source, an arc lamp) or a monochromatic source (e.g., a laser source, such as a laser diode, or a broadband source used in conjunction with a narrowband pass filter). Broadband light sources can have, for example, e.g., a wavelength spectrum having a full width half maximum (FWHM) of at least 6 nm, at least 12.25 nm, at least 25 nm, at least 50 nm, at least 100 nm, or at least 150 nm.

Figure 4:
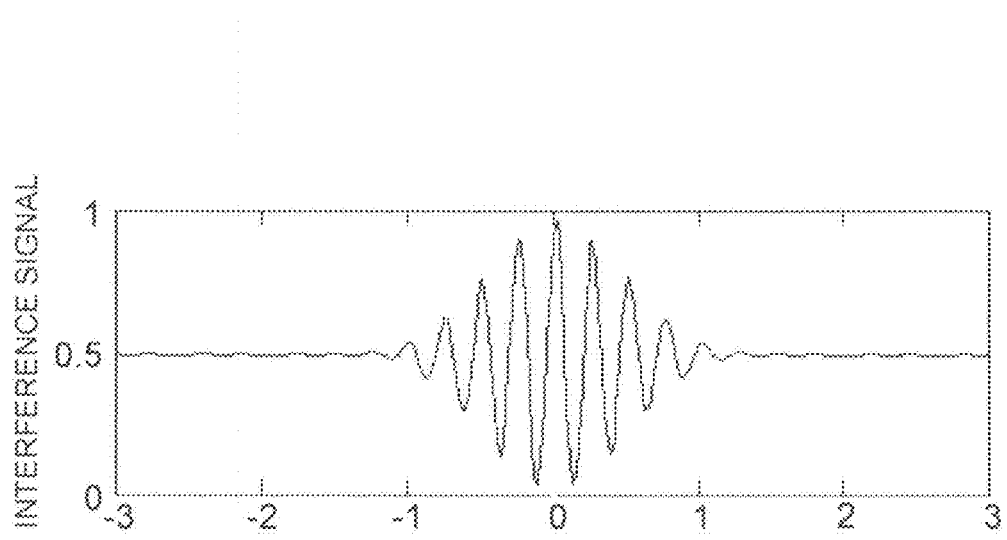
FIG. 4 is a plot of an exemplary interference signal for a single pixel generated when mixing the two orthogonal polarization states during a polarization OPD scan, assuming a broadband illumination.
Figure 5:
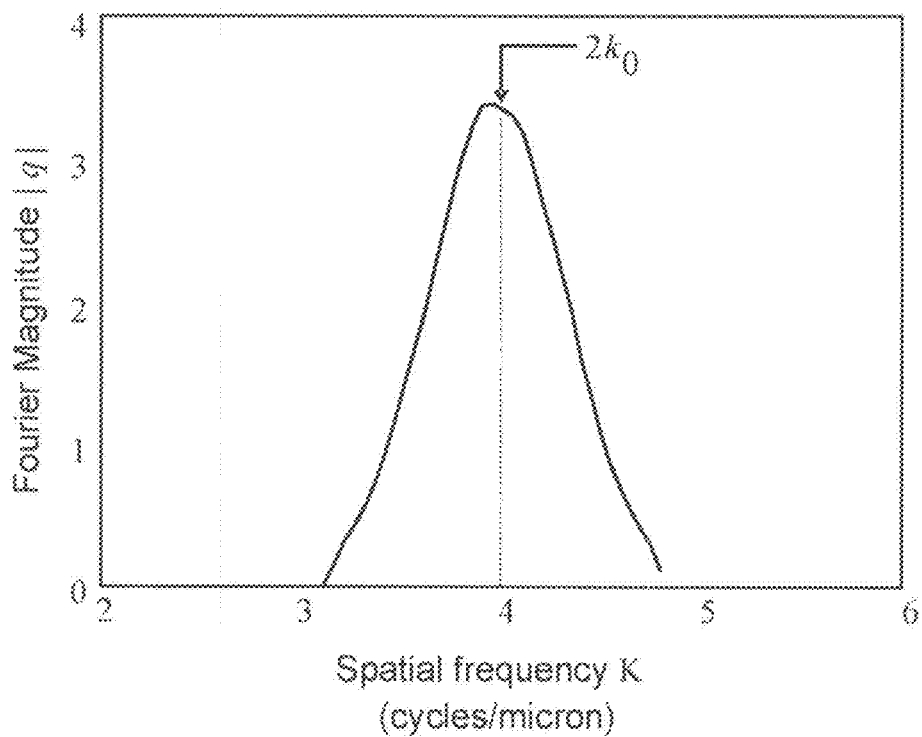
FIG. 5 is a plot showing a Fourier Transform of the signal shown in FIG. 4.

Light source 110 can be a spatially extended source or a point source. In certain embodiments, e.g., using either pupil-plane or test-surface imaging, light source 110 can be spectrally broadband, and can illuminate the test surface with at least two wavelength simultaneously. In this case, the polarization OPD scan generates a modulated signal similar to that shown in FIG. 4, which illustrates a signal that would be observed with a continuous, broadband spectrum 100 nm wide centered on a wavelength of 500 nm. The localization of interference effects is caused by the fact that the various wavelengths generate may overlapping interference signals that agree only at the position of zero OPD between the two polarization states. The Fourier Transform of the signal in FIG. 4 divides the signal into its constituent wavelengths, allowing the computer to determine the relative phase between the two polarization states as well as the strength of the interference signal contribution for each of two or more wavelengths. FIG. 5 shows the magnitude of the Fourier transform of the signal in FIG. 4. The spatial frequency labeled K is linearly proportional to the angular wavenumber k of the light source spectrum. Here, $k_0, =2\pi/500$ nm.

Turning now to polarization OPD shifters 130 and 630, in general, any device capable of shifting one polarization state with respect to an orthogonal polarization can be used. These include both electro-optical polarization OPD scanners, magneto-optical polarization OPD scanners, and mechano-optical OPD scanners. Electro-optical OPD scanners and magneto-optical polarization OPD scanners vary the OPD of one polarization state to another by way of an electric and magnetic field, respectively.

Figure 8:
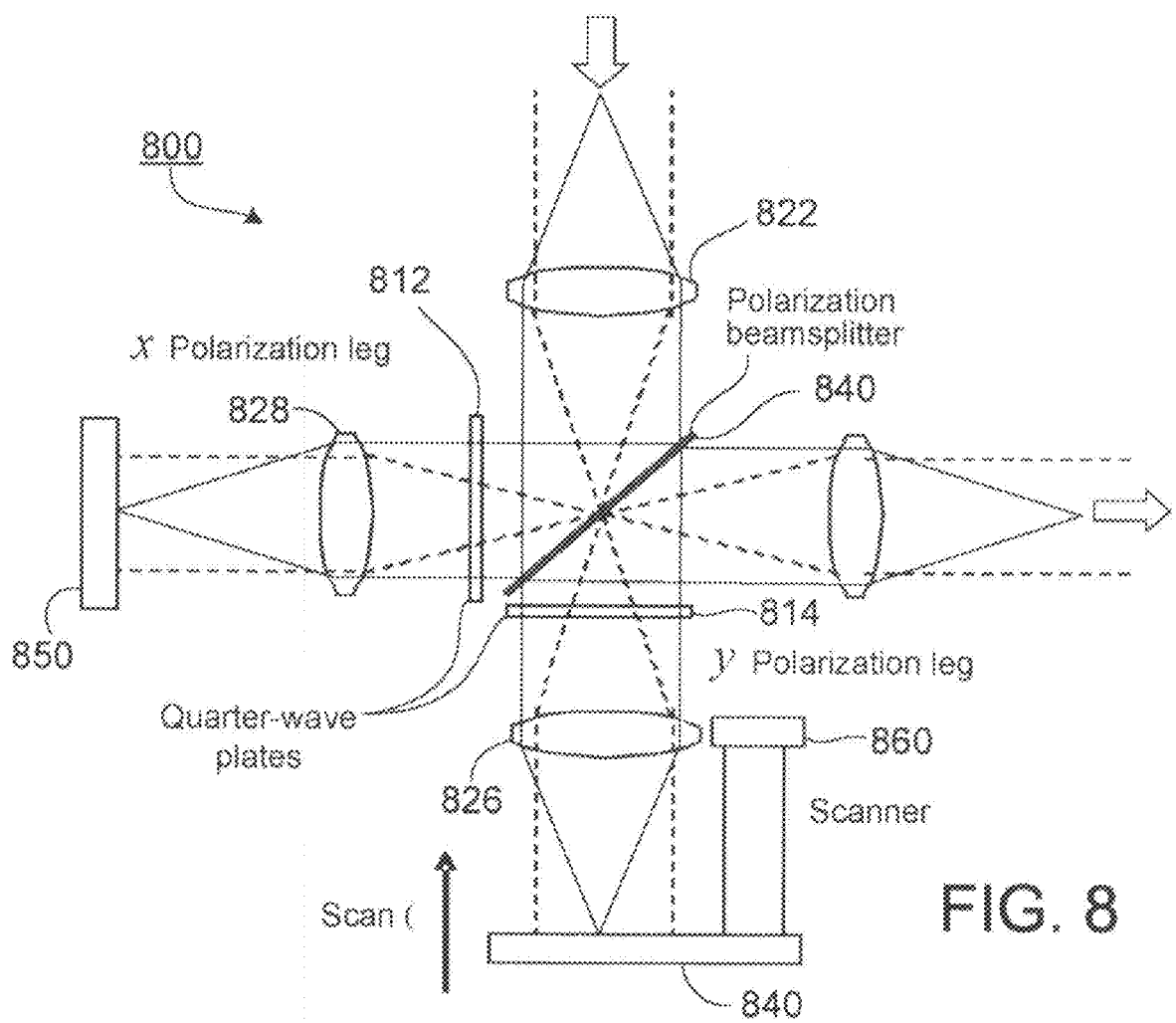
FIG. 8 is an embodiment of a mechano-optical polarization OPD shifter.

Typically, they include a component whose optical properties vary depending upon the presence of an electric or magnetic field. Components include liquid crystal cells and electro-optic crystals, for example, mechano-optical polarization shifters utilize a moving component to vary the OPD between polarization states. Referring to FIG. 8, an OPD scanner 800 includes a Mickelson interferometer. A polarization beam splitter 810 splits incoming light into two beams having orthogonal polarization states and directs the two beams along different paths. In FIG. 8, the different paths are denoted as the x-polarization leg and y-polarization leg, respectively. The x-polarization leg includes a mirror 850 which is fixed with respect to beam splitter 810. The y-polarization leg includes a mirror 840 which is coupled to an actuator 860 (e.g., a PZT actuator) configured to scan the position of mirror 840 with respect to beam splitter 810. Light reflected from mirrors 850 and 840 is recombined by beam splitter 810 and directed out of OPD scanner 800. Additional optical components may be included to direct the output light as necessary. Also included in OPD scanner 800 are lenses 822, 824, 826 and 828 and quarter wave plates 812 and 814, respectively. Quarter wave plates 812 and 814 may be achromatic quarter wave plates as necessary, for example, where used in conjunction with a broad band light source.

Figure 9:
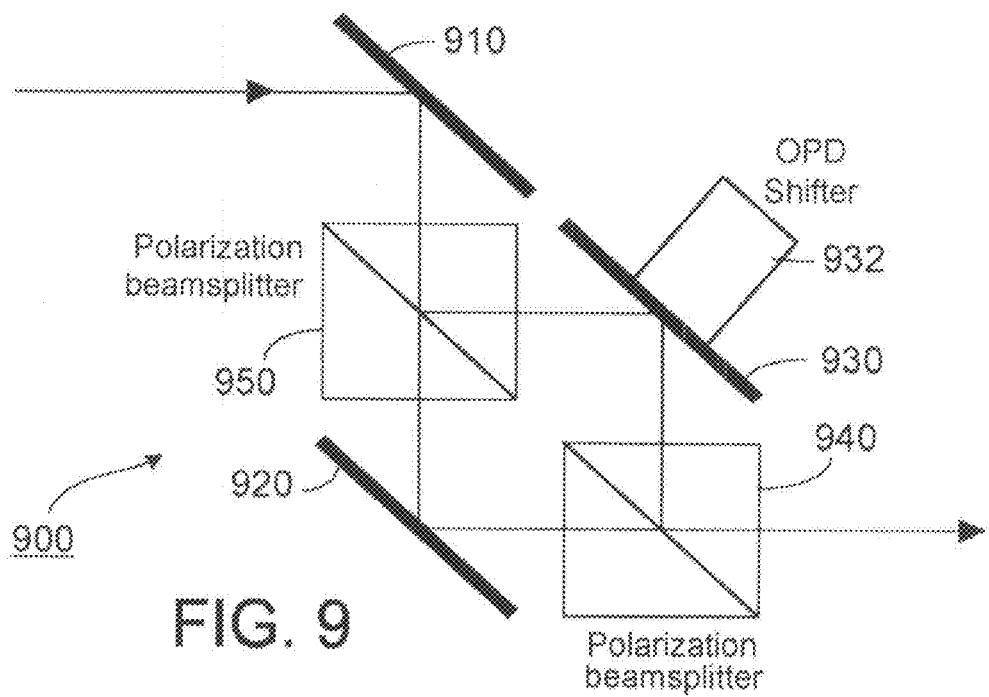
FIG. 9 is an embodiment of a mechano-optical polarization OPD shifter.

Referring to FIG. 9, a further example of a polarization OPD scanner 900 includes a pair of polarizing beam splitters 950 and 940, where polarizing beam splitter 950 is positioned to receive an input beam from a mirror 910. Beam splitter 950 directs a first beam corresponding to one polarization state of the incoming light along a fixed path 20 to polarizing beam splitter 940. A fixed mirror 920 is positioned in the path of this beam.

The other beam, corresponding to the orthogonal polarization state, reflects from another mirror 932 and is combined with the first beam by polarizing beam splitter 940 to produce an output beam. Mirror 930 is mounted on an actuator 932 configured to vary the position of mirror 930, thereby varying the optical path length of the second beam between beam splitter 950 and beam splitter 940.

Other mechano-optical configurations are also possible.

In general, the scan range of the polarization OPD scanner can vary. For embodiments that incorporate a broadband light source, the scan range should encompass at least the coherence length of the light source, e.g. several microns for a typical white-light source. In some embodiments, the scan range can be in a range from about 1 to 100$\lambda$, where $\lambda$ is a representative wavelength (e.g., a peak wavelength) of the source.

In general, while certain embodiments of microscope systems and polarization OPD shifters have been described, other embodiments are also possible. For example, one or more additional components can be included in the described systems. For example, microscopes and/or OPD shifters can include additional components such as one or more optical filters or an eyepiece lens for direct observation of the test object.

The systems disclosed above can be used for 21 variety of applications. For example, the systems may be used for analysis of surface structure of test object 180, including film thickness, material index, and optically-unresolved surface structure.

Types of test objects that can be analyzed include semiconductor wafers, MEMS devices, optical components, flat panel displays, and general R&D and production control use.

Among other applications, the techniques can be applied to process control in semiconductor manufacturing. An example of this is in-process monitoring of critical dimensions (CDs), which is central to the fabrication of many high-technology components on the micron and nanometer scales. Examples include semiconductor IC processes such as transistor and logic creation, as well as copper-damascened connections. Defined broadly, CDs include lateral dimensions, etch depth, film thickness, step height, sidewall angle and related physical dimensions that influence the performance of semiconductor devices. CD metrology provides process control and defect detection that occur in the course of manufacturing, specially as a result of processes such as etching, polishing, cleaning and patterning. In addition, the basic measurement capabilities implied by CD metrology have broad application outside of Semiconductor IC manufacturing, including, e.g., displays, nanostructures, and diffractive optics.

More generally, the techniques described above may used for any of the following surface analysis problems: simple thin films; multilayer thin films; sharp edges and surface features that diffract or otherwise generate complex interference effects; unresolved surface roughness; unresolved surface features, for example, a subwavelength width groove on an otherwise smooth surface; dissimilar materials; polarization-dependent properties of the surface; and deflections, vibrations or motions of the surface or deformable surface features that result in incident-angle dependent perturbations of the interference phenomenon. For the case of simple thin films, the variable parameter of interest may be the film thickness, the refractive index of the film, the refractive index of the substrate, or some combination thereof. For the case of dissimilar materials, for example, the surface may include a combination of thin film and a solid metal, and a fit of the angle-dependent surface properties would be made to a library of theoretical predictions which would include both surface structure types to automatically identify the film or the solid metal by a match to the corresponding interference intensity signal.

Any of the computer analysis methods described above can be implemented in hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

Accordingly, other embodiments are within the scope of the following claims.

What is claimed is:
1. A method, comprising:
using a microscope to direct light to a test object and to direct the light reflected from the test object to a detector, where the light comprises components having orthogonal polarization states;
varying an optical path length difference (OPD) between the components of the light;
acquiring an interference signal from the detector while varying the OPD between the components; and
determining information about the test object based on the acquired interference signal.

2. The method of claim 1, wherein determining information comprises transforming the signal to an inverse OPD domain.

3. The method of claim 2, wherein the signal is transformed using a Fourier transform.

4. The method of claim 1, wherein multiple signals are acquired while varying the OPD between the polarization states, each signal corresponding to a different detector element of the detector.

5. The method of claim 4, wherein the information about the test object is determined based on the multiple acquired signals.

6. The method of claim 1, wherein the microscope is configured to image the test object onto the detector.

7. The method of claim 1, wherein the microscope is configured to image a pupil plane of the microscope onto the detector.

8. The method of claim 1, wherein the OPD is varied by an amount greater than a coherence length of a source that provides the light.

9. The method of claim 1, wherein the varying the OPD between the components having orthogonal polarization states comprises directing the components along different paths and varying an optical path length of at least one component while the components are on the different paths.

10. The method of claim 9, wherein the components are directed along different paths prior to the light reflecting from the test object.

11. The method of claim 10, wherein the components are recombined along the same path prior to the light reflecting from the test object.

12. The method of claim 10, wherein the components are recombined along the same path after the light reflects from the test object.

13. The method of claim 9, wherein the components are directed along different paths after the light reflects from the test object.

14. The method of claim 1, wherein the light is provided by a low-coherence source.

15. The method of claim 1, wherein the light is broadband light.

16. The method of claim 1, wherein the light is monochromatic light.

17. The method of claim 1, wherein the light is provided by a point source.

18. The method of claim 1, wherein the light is provided by a spatially extend source.

19. The method of claim 1, wherein the test object comprises a surface feature that is optically unresolved by the microscope and determining information about the test object includes determining information about the optically unresolved surface feature.

20. The method of claim 19, wherein the information about the optically unresolved surface feature includes a height profile of the surface feature, an etch depth of the surface feature, a step height of the surface feature, a sidewall angle of the surface feature, a pitch of the surface feature, or a linewidth of the surface feature.

21. The method of claim 1, wherein determining information about the surface feature comprises comparing the signal or information derived from the signal to a set of modeled signals associated with a set of surface feature models or information derived from the set of modeled signals associated with the set of surface feature models.

22. The method of claim 1, wherein determining information about the surface feature includes receiving a modeled signal or information derived from the modeled signal based on a rigorous coupled wave analysis of a model surface feature.

23. The method of claim 1, wherein the surface feature is a diffractive structure.

24. The method of claim 1, wherein the test object comprises a silicon wafer.

25. The method of claim 1, wherein the test object comprises a component of a flat panel display.

26. A method; comprising:
  directing a first beam and a second beam to impinge on a test object, the first and second beams being derived from a common source and having orthogonal polarization states;
  detecting the first and second beams after they reflect from the test object using a common detector while varying an optical path length difference (OPD) between the first and second beams;
  acquiring an interference signal corresponding to intensity variations in the detected beams while varying the OPD between the first and second beams; and
  determining information about the test object based on the acquired signal.

27. The method of claim 26, wherein the first and second beams impinge on the test object along a common path.

28. An apparatus, comprising:
  a light source;
  a microscope arranged to direct light from the light source to impinge on a test object and to direct the light reflected from the test object to a detector, where the light comprises components having orthogonal polarization states; and
  a polarization optical path length difference (OPD) scanner configured to vary an OPD between the components of the light.

29. The apparatus of claim 28, further comprising an electronic processor coupled to the detector and configured to receive a signal from the detector in response to the varied OPD.

30. The apparatus of claim 29, wherein the electronic processor is also coupled to the polarization OPD scanner and is configured to co-ordinate the varying of the OPD with the acquisition of the signal by the detector.

31. The apparatus of claim 29, wherein the electronic processor is programmed to determine information about the test object based on the signal.

32. The apparatus of claim 31, wherein the electronic processor is programmed to transform the signal to an inverse OPD domain and to determine information about the test object based on the transformed signal.

33. The apparatus of claim 29, wherein the electronic processor is coupled to a computer readable medium that stores a library of information related to model surface features of the test object and the electronic processor is programmed to compare the signal or information derived from the signal with the library to determine information about the test object.

34. The apparatus of claim 28, wherein the detector is a pixilated detector and each pixel is configured to produce a corresponding signal while detecting the light.

35. The apparatus of claim 28, wherein the microscope comprises one or more optical components configured to image a pupil plane of the microscope onto the detector.

36. The apparatus of claim 35, wherein the one or more optical components form a Bertrand lens.

37. The apparatus of claim 28, wherein the microscope comprises one or more optical components configured to image the test object onto the detector.

38. The apparatus of claim 28, wherein the microscope comprises an objective and the polarization OPD scanner is positioned between the objective and the detector.

39. The method of claim 28, wherein the microscope comprises an analyzer which polarizes the light reflected from the test object prior to the detector.

40. The apparatus of claim 28, wherein the polarization OPD scanner is positioned in a path of the light between the light source and the microscope.

41. The apparatus of claim 28, wherein the light source is a broadband light source.

42. The apparatus of claim 28, wherein the light source is a low coherence light source.

43. The apparatus of claim 28, wherein the light source is a monochromatic light source.

44. The apparatus of claim 28, wherein the light source is a point light source.

45. The apparatus of claim 28, wherein the light source is an extended light source.

46. The apparatus of claim 28, wherein the polarization OPD scanner comprises a beam splitter that splits the components of the light into two separate beams, each corresponding to one of the components.

47. The apparatus of claim 46, wherein the polarization OPD scanner comprises optical components that direct the two separate beams along different paths before recombining the beams.

48. The apparatus of claim 47, wherein the polarization OPD scanning comprises an adjustable component configured to vary an optical path length of at least one of the paths.

49. The apparatus of claim 48, wherein the adjustable component is a mechanooptical component, an electrooptical component, or a magnetooptical component.

* * * * *

UNITED STATES PATENT AND TRADEMARK OFFICE
CERTIFICATE OF CORRECTION

| | | |
|---|---|---|
| PATENT NO. | : 7,978,337 B2 | Page 1 of 1 |
| APPLICATION NO. | : 12/267077 | |
| DATED | : July 12, 2011 | |
| INVENTOR(S) | : Peter De Groot et al. | |

It is certified that error appears in the above-identified patent and that said Letters Patent is hereby corrected as shown below:

Column 14, line 10 (claim 26), delete "method;" and insert --method-- therefor.

Signed and Sealed this
Eighth Day of November, 2011

David J. Kappos
*Director of the United States Patent and Trademark Office*